Nov. 8, 1949     L. I. YEOMANS ET AL     2,487,289
MACHINE TOOL Filed Sept. 24, 1943     7 Sheets-Sheet 1

Inventors
Lucien I. Yeomans
Raymond P. Frye
By Parker, Carlson, Pitzner & Hubbard
Attorneys.

Nov. 8, 1949 L. I. YEOMANS ET AL 2,487,289
MACHINE TOOL

Filed Sept. 24, 1943 7 Sheets-Sheet 4

INVENTORS
Lucien I. Yeomans
Raymond D. Frye
By Parker, Carlson, Pitzner & Hubbard
ATTORNEYS Nov. 8, 1949  L. I. YEOMANS ET AL  2,487,289

MACHINE TOOL

Filed Sept. 24, 1943  7 Sheets-Sheet 5

INVENTORS
Lucien I. Yeomans
Raymond P. Frye
By Parker, Carton, Pitzner & Hubbard
ATTORNEYS

Nov. 8, 1949     L. I. YEOMANS ET AL     2,487,289
MACHINE TOOL
Filed Sept. 24, 1943     7 Sheets-Sheet 6

Inventors
Lucien I. Yeomans
Raymond P. Frye
By Parker, Carlson, Pitney, Hubbard
Attorneys.

Nov. 8, 1949　　　L. I. YEOMANS ET AL　　　2,487,289
MACHINE TOOL

Filed Sept. 24, 1943　　　　　　　　　　7 Sheets-Sheet 7

Inventors
Lucien I. Yeomans
Raymond D. Frye
By Parker, Carlson, Pitzner, Hubbard
Attorneys.

Patented Nov. 8, 1949

2,487,289

UNITED STATES PATENT OFFICE 2,487,289

MACHINE TOOL

Lucien I. Yeomans and Raymond P. Frye, Chicago, Ill., assignors to Lucien I. Yeomans, Inc., Chicago, Ill., a corporation of Illinois Application September 24, 1943, Serial No. 503,630

5 Claims. (Cl. 90—58)

This invention relates generally to machine tools such as planers and milling machines having long work supporting tables which are arranged for longitudinal reciprocation.

The general object of the present invention is to provide a machine tool embodying a novel and improved drive mechanism for reciprocating its work supporting table.

More particularly, it is an object of the invention to provide a machine tool having a longitudinally reciprocable work supporting table which is sectionalized, together with a novel arrangement for driving such a sectionalized table.

A more detailed object is to provide a multiple chain drive for a reciprocating work table combined with novel means for distributing the driving force.

Other objects and advantages of the invention will become apparent from the following detailed description taken in connection with the accompanying drawings, in which.

While the invention is susceptible of various modifications and may be practiced in various ways, we have illustrated in the drawings and will describe here in detail the preferred embodiment and method. It is to be understood, however, that we do not intend to limit the invention by such specific disclosure but aim to cover all modifications, alternative constructions, methods, and uses falling within the spirit and scope of the invention as expressed in the appended claims.

In the drawings, the invention is embodied for purposes of illustration in a machine tool having a table 1 and a supporting bed structure 2 such as are suited for use in a planer or milling machine, the table being of substantial size and having a long range of longitudinal reciprocation. As a preliminary to a description of the exemplary table drive mechanism for the illustrated machine tool embodying the present invention, the table itself and its supporting bed structure will be described. It is to be understood, however, that the table per se forms the subject matter of our copending application Serial No. 604,551, filed July 12, 1945, and now Patent No. 2,466,631, granted April 5, 1949, as a division of this present application, and that the arrangement for guiding and supporting the table herein shown constitutes the subject matter of our copending application Serial No. 604,552, filed July 12, 1945, and now Patent No. 2,419,868, granted April 29, 1947, as a division of the present application. The top of the table is T-slotted in the usual way to permit the clamping thereto of workpieces which are machined by tools mounted in heads 9 which are fed vertically along ways 3 on columns 4 or along a crossrail in the case of certain types of milling machines.

To facilitate shipment and final assembly without material machining of the parts, the bed 2 is divided both laterally and longitudinally of the direction of table travel into separate sections 5 and 6 in the form of hollow castings ribbed both laterally and longitudinally. The center or intermediate sections 5 are arranged end to end and are cast with a top wall 7 having laterally spaced downwardly converging portions. Outwardly opening grooves 10, Fig. 13, of generally semi-circular cross-section are cast in the section 5, these grooves being spaced inwardly from the vertical side walls 11 of the section. The sections 6 are arranged end to end along the sides 11 of the intermediate sections 5 just out of edgewise abutment with the latter and out of longitudinal abutment with each other. Each has a generally flat-top wall formed with laterally spaced upstanding ribs 17 intermediate its sides. Along the outer side is a depressed portion 18 which alines with the corresponding portions of the row of sections 6 to form a trough extending the full length of the bed.

The rigid bed structure 2 may be formed at the location where the machine tool is ultimately to be used, and this, without preliminary machining of the surfaces of the castings 5 and 6 prior to their assembly and anchorage to the foundation 12 at said ultimate location. To form the bed, two side rows of the sections 6 and one intermediate row of the sections 5 are arranged on the foundation and grouted in place with their rough sides and ends separated by narrow gaps 13 so as to avoid interference between the roughly cast surfaces. The gaps between the side sections 6 in each row are filled so that the trough formed by depressed portions 18 is capable of retaining a liquid.

Figure 13:
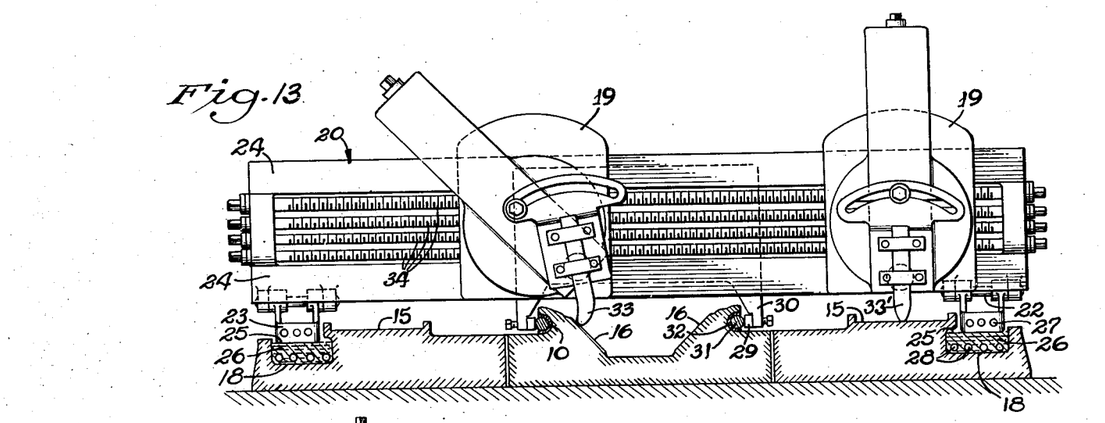
Fig. 13 is a front elevational view of the set-up for machining the table ways.
Figure 14:
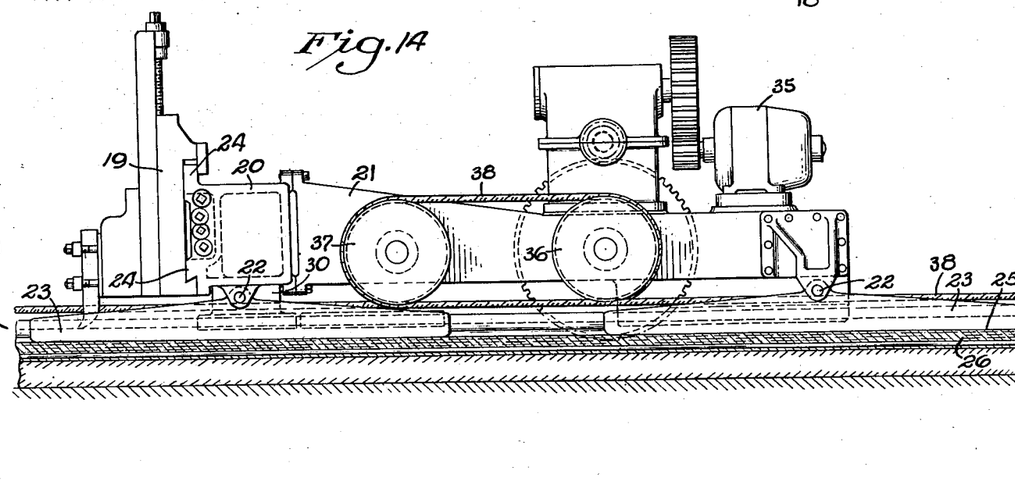
Fig. 14 is a side view of the mechanism shown in Fig. 13.

After such final and rigid assembly of the bed sections, two horizontal surfaces 15 and two converging surfaces 16 are machined on the sections 5 and 6 respectively throughout the length of the bed. These support the side and intermediate portions of the table for longitudinal reciprocation of the latter, the surfaces 16 also serving to guide the table laterally. Formation of these surfaces with the required precision may be effected by the temporary tool set-up shown in Figs. 13 and 14. In this, tool heads 19, which may be the ones to be used in the final machine tool assembly, are mounted to slide along ways 24 on a rail 20 which is secured to the front of a carriage 21 (Fig. 14). On opposite sides and at opposite ends, the carriage is supported by pivots 22 on elongated shoes 23 which are adapted to slide along temporary guide surfaces 25 formed by solidifying bodies 26 of liquid in the troughs. Preferably, the liquid is water which may be frozen by circulating refrigerant through a coil 28. The guide surfaces 25 are thus formed perfectly level without the necessity of preliminary machining of any of the parts of the bed structure. The shoes 23 and the bodies of ice are maintained at the freezing temperature by circulating refrigerant through coils 27 and 28.

To guide the tool carriage 21 laterally, hardened blocks 29 on arms 30 depending from the rail bear against hardened bars 31 which are supported by fillings 32 of babbit or the like cast into the grooves 10. The fillings are cast while the bars 31 are supported by temporary means with the outer guide surfaces perfectly parallel. These guides also are formed on the bed without the necessity of any machining of the bed castings.

Any suitable tools 33 and 33' may be employed for machining the ways 15 and 16, planer tools being shown herein and mounted on the heads 19. By manipulating suitable screws 34, the tool 33 may be fed along the rail and may be advanced at the proper angle relative to its supporting head. To form the other surface 16, the angle of the feed of the tool 33' is of course reversed. Movement of the carriage 21 back and forth along the bed to machine the ways may be effected by power derived from a reversible motor 35 mounted on the carriage and operable through reduction gearing to drive a drum 36 around which, together with an idler drum 37, a cable 38 is extended with its ends anchored to opposite ends of the bed. After preliminary machining of ways 15 between the ribs 17 and both of the ways 16, all of the ways are scraped and finished in the usual way.

Figure 4:
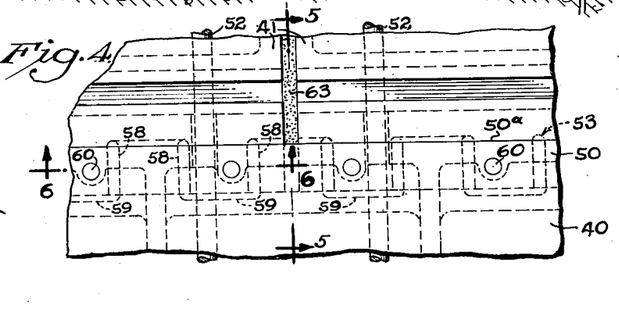
Fig. 4 is an enlarged view of a portion of Fig. 2.

The table 1 is also of sectional construction and is built up on the bed structure after the latter has been constructed and machined as above described at the final location where the machine tool is to be used. The table is composed of two rows of side sections 40 arranged on opposite sides of a row of intermediate sections 41, the sections of each row being arranged end to end longitudinally of the table and preferably are separated sufficiently (see Figs. 2 and 4) to avoid the necessity of machining the adjacent surfaces of the castings.

The bottoms of the intermediate sections 41 complement the ways 16 and for this purpose are cast with a depending longitudinal rib 42 whose inclined sides are machined accurately to the same V-shape as the ways 16 into which the ribs fit. The sections thus supported are held effectually against lateral displacement during their sliding movement.

Along its outer margin, each side section 40 is supported on one of the bed ways 15 over two flat areas defined by the bottom surfaces 43 of generally circular buttons 44 (Figs. 1 and 2) projecting from the bottom of the section adjacent the outer edges of the latter and mounted on the section for some degree of universal movement whereby to permit the buttons to adapt themselves automatically to the bed ways. Herein, the upper portions 45 of the buttons have peripheries machined to a slightly spherical contour and fitting in the internal bore of annular flanges 46 cast on the bottom of the table section. To provide the universal connection, the space between the closed end of the bore and the button is filled with a yieldable or flowable material such as readily pliable synthetic rubber in the form of a layer 47 separated from the button by a thin metal disk 48 that fits closely in the bore. In this way, the weight of each section is sustained by the non-compressible material and is distributed uniformly over the bottom surfaces of the buttons without the necessity of locating the latter accurately by preliminary machining.

Figure 1:
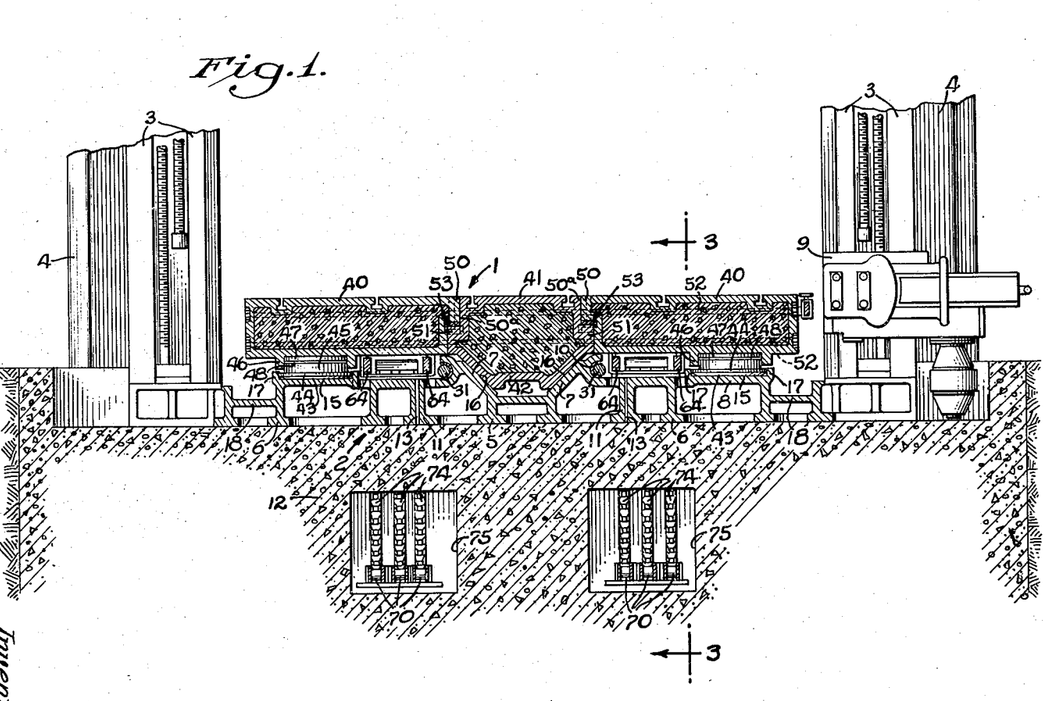
Figure 1 is a fragmentary transverse sectional view of the table and tool supporting columns of a machine tool embodying the novel features of the present invention.
Figure 5:
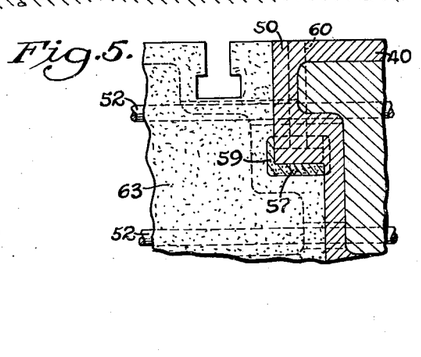
Figs. 5 and 6 are fragmentary sectional views taken along the lines 5—5 and 6—6 respectively of Fig. 4.
Figure 6:
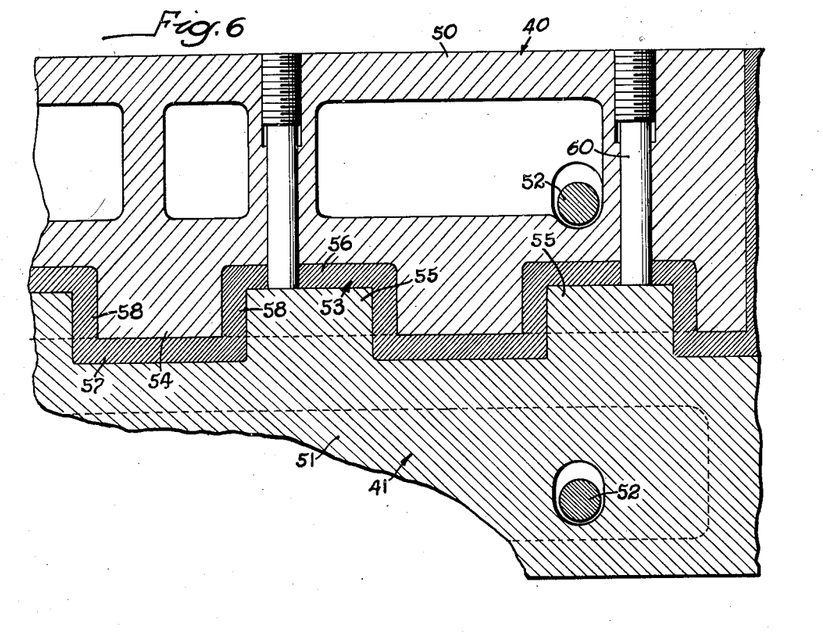

Along their inner edges, the side sections 40 are supported by the center sections 41. For this purpose, the upper half portion 50 (Figs. 1 and 5) of the side wall on the section 40 projects beyond the lower portion of this section, and similarly, the lower portion 51 at the side of the center sections 41 projects beyond the upper portion so as to underlie the portions 50. Preferably, the laterally facing surfaces of all four of these portions are machined accurately as to lateral spacing and parallelism so as to fit against each other in abutting edge to edge relation as shown in Fig. 1 and indicated at 50ª. This relation is maintained by upper and lower rows of tie bolts 52 extending transversely through the sections 40 and 41 of the three rows.

Figure 7:
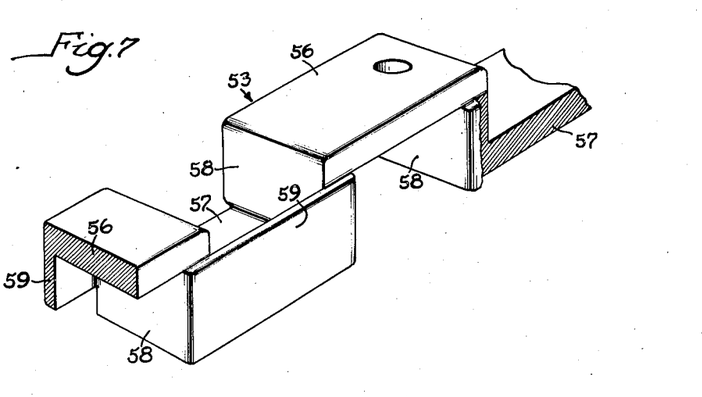
Fig. 7 is a fragmentary perspective view of a key for locking the table sections together.

The side and center sections are locked together in a novel manner by casting a key 53 (Fig. 7) in spaces formed between squared projections 54 depending from the edge portions 50 of the sections 40 and similar intervening projections 55 upstanding from the underlying portions 51 of the sections 41, each projection on one part being smaller than the notch on the other part into which it projects thereby forming horizontal and vertical spaces in which horizontal parts 56 and 57 and vertical parts 58 of the key 53 are formed. The latter also includes a part 59 connecting the parts 58 on one side of the key as shown in Fig. 7. Thus, the portions 50 of the sections 40 are supported on the portions 51 of the center sections by the horizontal parts 56 and 57 of the key, while the vertical parts 58 of the key serve to lock the adjacent sections 40 and 41 rigidly against relative longitudinal displacement. The parts 59 hold the sections against any possible relative lateral displacement in the absence of a precise fit between the machined sides of the adjacent sections. Thus, the desired supporting and locking connection may be formed between the adjacent table sections without the necessity of machining the roughly cast surfaces of the interlocking projections 54 and 55 and simply by pouring molten type metal into the space while the sections are held in the proper relationship.

In assembling the table, the central sections 41 are placed on the ways 16 with their ends spaced apart to insure full support of each section solely by these ways. Next, the side sections are placed on the bed with their buttons 44 resting on the surfaces 15. The inner margins of these sections are temporarily supported on the center sections by screws 60 (Figs. 2, 4, 5, and 6) which thread through vertical holes in the overlying portions 50 with their lower ends bearing on the top surfaces of the projections 55. The upper and lower rows of the tie bolts 52 are then extended transversely of the table through the three rows of sections and tightened. The levelling screws 60 are adjusted as may be required in order to permit the machined edge surfaces of the sections to come into full contact as the bolts are finally tightened. Now, all of the sections will be fully supported from the ways 15 and 16 and in the exact relation they are to occupy in the final table assembly. After plugging the ends of the spaces between the sections of each row and other points from which liquid might escape, molten type metal is poured into the key spaces filling the same and flowing into all of the other interconnected spaces to form fillings 63 between the sections in each row. The two unitary keys 53 which are thus formed extend throughout the length of the table, and all sections of the three rows become locked together in a manner to resist relative movement between the sections in any direction under applied compressive stresses. The bolts 52 hold the sections against lateral separation.

At their ends, the three rows of sections 40 and 41 are connected by rigid castings 61 extending across the ends and fastened thereto by cap screws 62. To hold the sections of each row against longitudinal separation and provide means by which a driving force may be applied to the table, two pairs of bars 64 (Figs. 1, 2, 3, and 10) extend longitudinally of the table beneath the inner edge portions of the sections 40. At their ends, the bars of each pair are secured by bolts 65 to brackets 66 which abut against the table ends and are bolted. The spaces between the brackets and the table ends are filled with type metal 67 so as to avoid machining of the ends of the table sections. The table constructed as above described constitutes a rigid structure which is slidable along the bed ways with the precision required in present day machine tools, and this, in spite of the fact that the table is divided both longitudinally and laterally into rows of comparatively small sections which are held together rigidly and accurately with a minimum of preliminary machining. After the table has been built up in this way at the location where the machine tool is to be used, its top surface may be machined to provide a perfectly flat horizontal work supporting surface by using the regular tools of the machine tool. In a similar way the usual T-slots may be formed in the table top.

Figure 2:
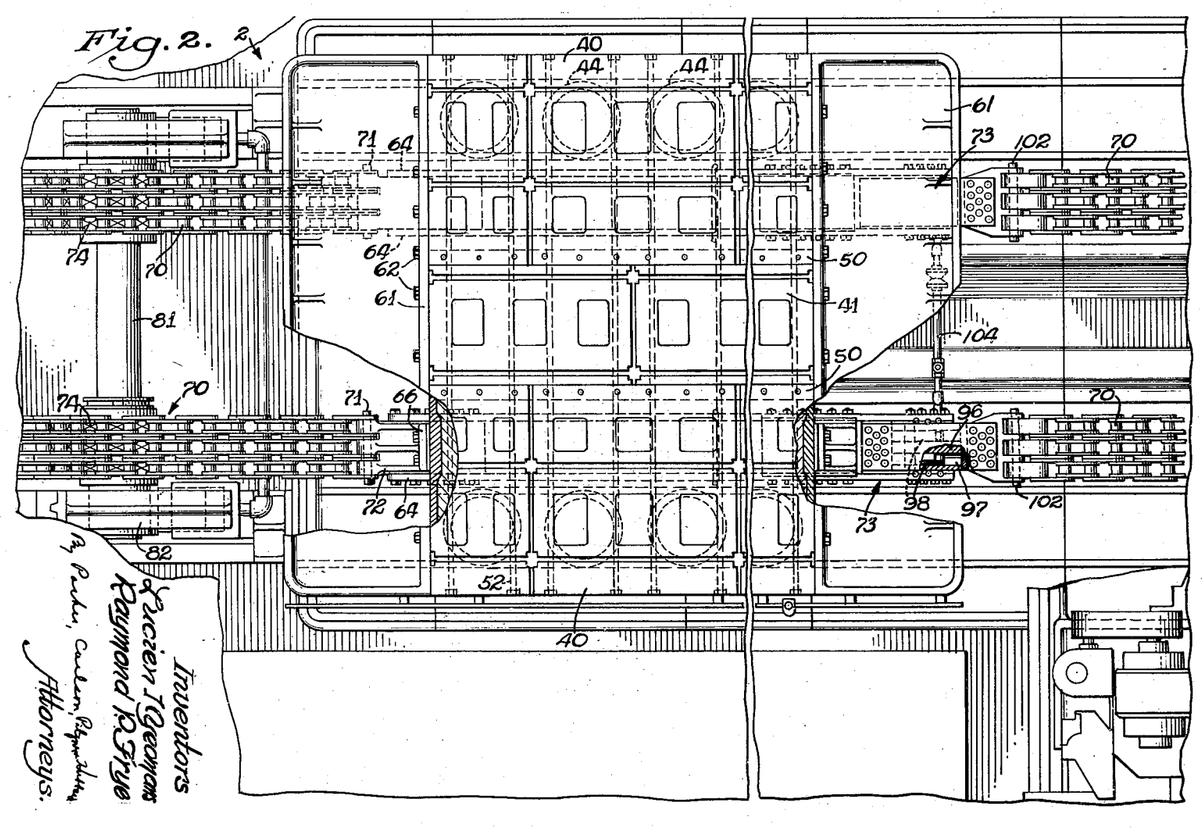
Fig. 2 is a fragmentary plan view of the table.
Figure 3:
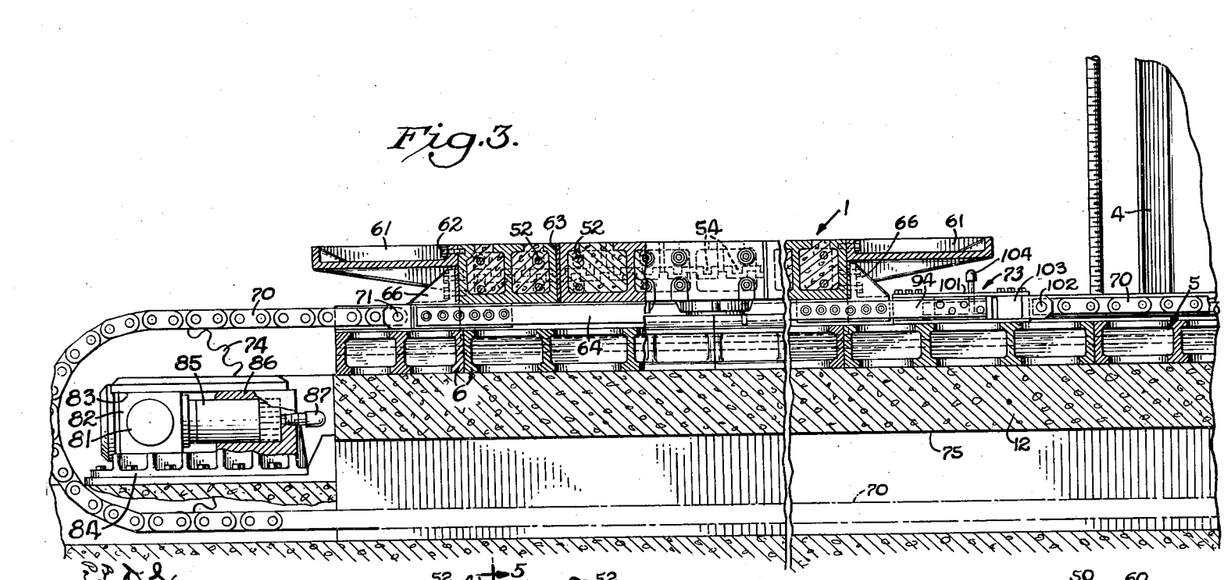
Fig. 3 is a partial section taken along the line 3—3 of Fig. 1.
Figures 8, 9:
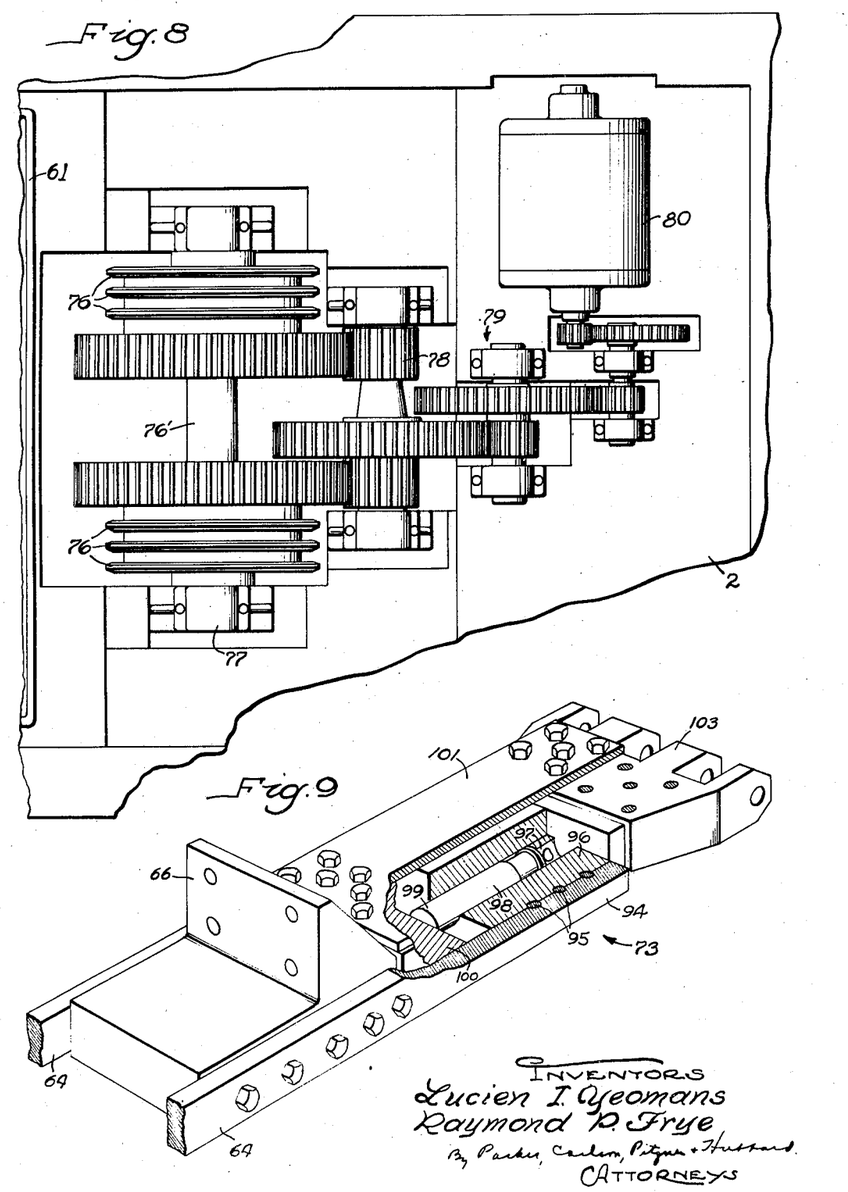
Fig. 8 is a fragmentary plan view of one of the table drive mechanisms.
Fig. 9 is a fragmentary perspective view of a part of the mechanism for tensioning the table drive chain.
Figure 10:
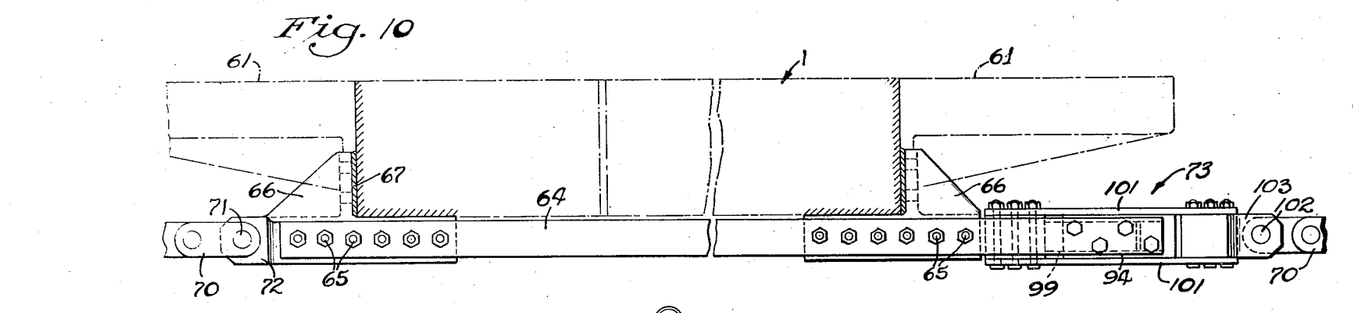
Fig. 10 is a fragmentary elevational view showing the manner of connecting the actuating chains to the table.

In view of the substantial size and weight of the table, special means is, in accordance with the present invention, provided for moving it back and forth along the bed ways. The actuating force is applied to the bar 64 thereby pushing instead of pulling the table so as to avoid any tendency to separate the sections. In the present instance, the actuating means comprises two sets of three roller type chains 70 having one of their ends connected by pivot pins 71 to tail pieces 72 projecting from the bracket 66 (Figs. 2 and 10). At the other end of the table, the chain ends are connected to the bracket 66 through the intermediary of adjusting devices 73 to be described later. From these points of anchorage, the chains extend away from the table in one direction, around sprockets 74 (Figs. 2 and 3) then underneath the table and the bed through passages 75 in the foundation, around sprockets 76 (Fig. 8) at the other end of the bed, and finally reversely to the second end of the table through the tensioning devices 73. Since the chains are not connected directly to the table but instead to the bars 64, a pull exerted by one end portion of the chains will be applied as a push to the opposite end of the table. Thus, the table is placed under compression as an incident to its actuation, being adapted to withstand such stress even though the sections in each row and the several rows of sections are connected only by the fillings 63 and the keys 53.

The sprockets 76 are fast on a shaft 76' journaled in bearings 77 beyond the end of the bed. Gears on this shaft mesh with pinions 78 which are driven through reduction gearing 79 by a reversible electric motor 80 whose operation may be controlled to regulate the direction and extent of movement of the table.

Figures 11, 12:
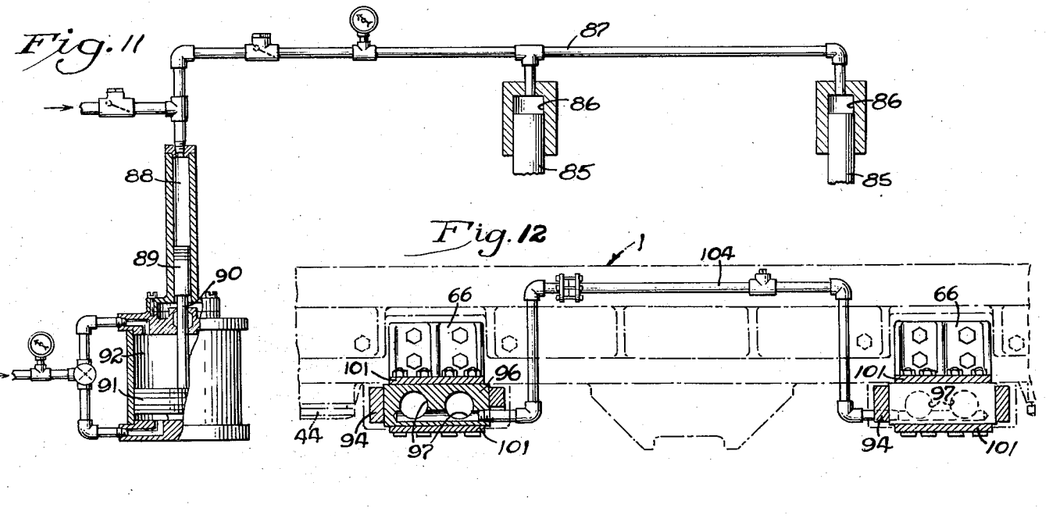
Figs. 11 and 12 show the piping for the table chain tensioning mechanisms.

The other sprockets 74 are on a shaft 81 journaled in blocks 82 which are slidable in guideways 83 on a base 84 (Fig. 3) fastened to the foundation beyond the end of the bed. Projecting toward the bed from these blocks are pistons 85 (Figs. 3 and 11) reciprocable in cylinders 86 rigid on the base 84. Both of the cylinders are in constant communication through a pipe 87 with a source of fluid under pressure sufficiently high to maintain the chains taut and prestress the latter to a substantial degree. In the present instance, the pipe leads to a cylinder 88 closed by a piston 89 whose rod 90 is connected to a piston 91 of substantially larger area in a cylinder 92. Compressed air from a source (not shown) is admitted to the head end of the cylinder resulting in actuation of the piston 89 to place the fluid in both of the cylinders 86 under the desired pressures. Both cylinders 86 being connected to the pressure source, the two sets of chains will be maintained taut under equal tension. Such prestressing of the chains is desirable in order to avoid any back lash upon reversal of the table drive mechanism.

The bearings 77 supporting the sprockets 76 are mounted stationarily and the sprockets are driven by separate reduction gear trains. Therefore, slight differences in the shape of the sprocket and gear teeth through which the different chains are driven will, during movement of the table to the right as viewed in Fig. 3, tend to produce uneven distribution of the actuating force between the two chains. The devices 73 interposed as above described in the portions of the chain between the table and the sprockets 76 operate as adjustable hydraulic links to effect automatic equal distribution of the actuating force between the two chains. For this purpose, the projecting tail pieces 94 (Figs. 2, 9, and 12) of the bars 64 are connected rigidly as by keys 95 to a block 86 providing cylinders 97 in which are pistons 98. The projecting end 99 of the latter bears against a block 100 rigid with bars 101 which are connected to the first chain pivot 102 by a link 103. There is a pair of cylinders 97 for each set of chains and the closed ends of the cylinders of one pair communicate with those of the other pair through a pipe 104 (Figs. 2 and 12) forming a closed system which is filled with liquid. In view of the non-compressibility of the liquid, any increase in tension developing in one set of chains will increase the fluid pressure in the associated cylinders causing a transfer of fluid to the cylinders on the other side of the machine until the pressure in all four of the cylinders is equalized and all of the chains are stressed equally. Thus the devices 73 coacting with the preloading pistons and cylinders 85 and 86 insure uniform division of the table actuating force between the chains of the two sets under all conditions and in spite of manufacturing inaccuracies.

It will be apparent from the foregoing that the present invention greatly facilitates the construction of machine tools by minimizing the machine work required, and by enabling large size tables and bed structures to be constructed in sections that may be shipped and handled easily and assembled at low cost in the final location where the machine tool is to be used.

We claim as our invention:

1. A machine tool having, in combination, a table mounted for endwise reciprocation, two laterally spaced sprocket chains having opposite ends connected to said table and providing elongated loops disposed beneath the table, sprockets meshing with said chains beyond opposite ends of said table, power driven means for rotating certain of said sprockets to move the table back and forth, mechanisms for tightening the chains individually and each including a cylinder containing fluid and a piston therein developing a force acting outwardly on said loops, and a common source of pressure fluid communicating with said cylinders and operable through the latter to maintain the chains equally preloaded.

2. A machine tool having, in combination, a table mounted for endwise reciprocation, two laterally spaced sprocket chains having opposite ends connected to said table and providing elongated loops disposed beneath the table, sprockets meshing with said chains beyond opposite ends of said table, power driven means for rotating certain of said sprockets to move the table back and forth, a hydraulic link connection of variable length interposed in each of said loops and comprising a fluid filled cylinder and a piston movable therein to compress the fluid when the chain is placed under tension, and means providing a closed fluid connection between said cylinders, said means being adapted to permit equalization of the forces applied to said chains by said power driven means.

3. A machine tool having, in combination, a table mounted for endwise reciprocation, two laterally spaced sprocket chains having opposite ends connected to said table and providing elongated loops disposed beneath the table, sprockets meshing with said chains beyond opposite ends of said table, power driven means for rotating certain of said sprockets to move the table back and forth, an equalizing device interposed in each of said chains, and force transmitting means interconnecting said equalizing devices to effect even distribution of the tension applied to each of said chains by said power driven means.

4. A machine tool having, in combination, a table mounted for endwise reciprocation, two laterally spaced sprocket chains having opposite ends connected to said table and providing elongated loops disposed beneath the table, pairs of sprockets meshing with said chains beyond opposite ends of said table, power driven means for rotating certain of said sprockets to move the table back and forth, means supporting one of said pairs of sprockets to float longitudinally of said table, hydraulic actuators acting outwardly of said loops and on the respective floating sprockets to tighten the chains individually, and a common means for energizing said actuators to preload said chains equally.

5. A machine tool having, in combination, a table mounted for endwise reciprocation, two laterally spaced sprocket chains having opposite ends connected to said table and providing elongated loops disposed beneath the table, pairs of sprockets meshing with said chains beyond opposite ends of said table, power driven means for rotating certain of said sprockets to move the table back and forth, means supporting one of said pairs of sprockets to float longitudinally of said table, hydraulic actuators acting on the respective floating sprockets to tighten the chains individually, a common means for energizing said actuators to preload said chains equally, and devices interposed in the chains between the other pair of sprockets and the table and interconnected to maintain the associated chain ends tensioned equally.

LUCIEN I. YEOMANS.
RAYMOND P. FRYE.

REFERENCES CITED

The following references are of record in the file of this patent:

UNITED STATES PATENTS

| Number | Name | Date |
|---|---|---|
| 1,189,675 | Fageol | July 4, 1916 |
| 1,218,044 | Todd | Mar. 6, 1917 |
| 1,309,384 | Yeomans | July 8, 1919 |
| 1,859,025 | Chace | May 17, 1932 |
| 1,888,309 | Cramer | Nov. 22, 1932 |
| 1,913,975 | Coe | June 13, 1933 |
| 2,181,185 | Ives | Nov. 28, 1939 |
| 2,317,734 | Cook | Apr. 27, 1943 |
| 2,363,383 | Bertoldo et al. | Nov. 21, 1944 |
| 2,376,929 | Madsen | May 29, 1945 |

FOREIGN PATENTS

| Number | Country | Date |
|---|---|---|
| 14,143 | Great Britain | Sept. 9, 1890 |